United States Patent Office 3,030,377
Patented Apr. 17, 1962

3,030,377
PROCESS FOR THE MANUFACTURE OF NITRILES OF TETRACYCLINES
Alfons Söder, Frankfurt am Main, and Walter Siedel, Bad Soden (Taunus), Germany, assignors to Farbwerke Hoechst Aktiengesellschaft vormals Meister Lucius & Brüning, Frankfurt am Main, Germany, a corporation of Germany
No Drawing. Filed Aug. 23, 1960, Ser. No. 51,263
Claims priority, application Germany Aug. 27, 1959
8 Claims. (Cl. 260—313)

Derivatives of tetracyclines that inhibit the growth of, for example, pathogenic micro-organisms, can be obtained by chemical reaction of their nitriles (German Patent 1,015,796, British Patent 800,699), for example, by the reaction of a nitrile of a tetracycline with isobutylene in the presence of a strong acid. These nitriles are accessible by dehydration of the acid amide group of the tetracyclines. This dehydration, however, must be carried out under very smooth conditions, since there would otherwise be formed by a competing reaction anhydrotetracyclines (J. Am. Chem. Soc., 75 (1953), 5455). The scheme of these reactions is illustrated by the following example on tetracycline:

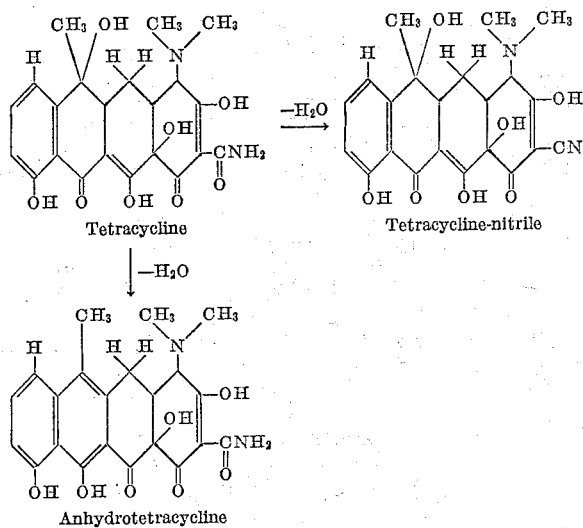

For the preparation of these nitriles there was described up to now only the use of aryl or alkylsulfonic acid chlorides, for example, toluene-sulfochloride, benzene-sulfochloride, naphthalene-sulfochloride and methane-sulfochloride, further aryl-carboxylic acid chlorides such as 3,5-dinitrobenzoyl chloride, and phosgene (German Patent 1,015,796; J. Am. Chem. Soc., 75 (1953), 5455; J. Am. Chem. Soc., 76 (1954), 3568; Brit. Patent 766,512; J. Am. Chem. Soc., 79 (1957), 2849). It is also known that tetracycline-nitrile can be prepared by hydration of 7-chlortetracycline-nitrile (German Patent 1,025,868).

The use of the sulfonic acid chlorides in such reactions has the serious disadvantage that, in addition to the desired formation of nitriles, there takes place in most cases esterification with the hydroxy groups of the tetracyclines (J. Am. Chem. Soc., 75 (1953), 5455; J. Am. Chem. Soc., 76 (1954), 3568; Brit. Patent 766,512; J. Am. Chem. Soc., 79 (1957), 2489). Carboxylic acid chlorides in most cases lead to esterification only, without a trace of a nitrile being formed (for the detection of the nitrile group serves the band at 4.5µ of the infrared absorption spectrum). These esters are in most cases difficultly hydrolized, however, without undesired reactions or loss of yield occurring. Often, they are not at all hydrolizable.

Now, we have found that nitriles of tetracyclines, their isomers, anhydro compounds or derivatives can be obtained by reacting tetracyclines or their isomers, anhydro compounds or derivatives which contain the ring system of the tetracycline or anhydrotetracycline, an unsubstituted acid amido group in the ring A, the known substitution of the C-atoms 1 and 3 of the tetracycline of the general formula

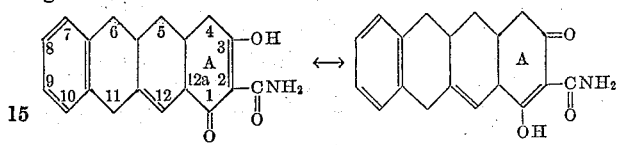

Ring system of tetracycline

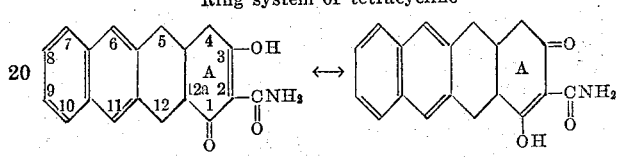

Ring system of anhydrotetracycline and that may also carry substituents at the C-atoms 4 to 12a which are inert towards carbodiimides, such, for example, as the hydroxy, ester, ether, keto, methyl and quaternary amino groups, chlorine or bromine, tertiary amino groups that are linked directly or over a methylene group (Mannich compounds) with the ring system, or the acid addition salts thereof, provided these are capable of salt formation due to their structure with disubstituted carbodiimides at temperatures in the range of 0° to +100° C., preferably at temperatures between +15° and +50° C., and suitably in the presence of inert, anhydrous solvents and by isolating in usual manner the nitriles formed.

As carbodiimides there enter into consideration, for example, dicyclohexyl carbodiimide, di-tert.-butyl-carbodiimide, diisopropyl-carbodiimide, methyl - tert. - butyl-carbodiimide, n-butyl-cyclohexylcarbodiimide and isopropyl tert.-butyl-carbodiimide. These compounds are accessible, for example, according to Liebigs Ann. Chem. 560, 22 (1948).

The dicyclohexylcarbodiimide, which is easily accessible and very stable, is particularly suitable for these reactions.

As starting materials, hereinafter referred to as tetracyclines, are suitable all the compounds that contain the tetracycline or anhydrotetracycline ring system, and the addition salts thereof insofar as they do not carry substituents that are sensitive towards carbodiimides. In particular there may be used tetracycline, 5-hydroxytetracycline, 7-chlortetracycline, 7-bromtetracycline, the corresponding 6-desmethyl-, 12a-deshydroxy-, 6-deshydroxy-, 5a(11a)-dehydro-, epi- and anhydro-compounds and the acid salts thereof, the corresponding 4-desdimethylamino and such tetracyclines as carry a quaternary amino group in 4-position. Furthermore, there are suitable for the process of the present invention aminomethylated tetracyclines, for example, pyrrolidinomethyl-tetracycline, piperidinomethyl-tetracycline, morpholinomethyl-tetracycline, diethylaminomethyl-tetracycline, the corresponding chlor-, brom- and hydroxy-tetracyclines, the epimers and anhydro-compounds and their acid addition salts.

If the tetracyclines to be reacted, the isomers or derivatives thereof, contain tertiary of quaternary amino groups, it is advantageous to add to these bases, before the reaction, one equivalent of a strong mineral acid, for example, a hydrohalic acid. It is also possible to start directly from the acid addition salt of these bases.

The reaction is advantageously effected in an inert, anhydrous solvent. As such are very suitable lower alcohols, methanol, ethanol, propanol, isopropanol, dimethyl-formamide, and dimethyl-sulfoxide.

The isolation of the reaction products is facilitated by the fact that they have to be isolated from the substituted urea formed only.

In order to prepare the nitriles, the corresponding tetracycline or the acid addition salt thereof is dissolved or suspended in an inert solvent and 1–3 moles of the carbodiimide are added, while stirring. After some time, a clear solution forms. In many cases, the desired nitrile crystallizes from the reaction mixture after a few minutes up to several hours. If, however, the nitrile is soluble in the solvent used, the nitrile can be easily obtained by elimination of the solvent under reduced pressure. The separation from the substituted urea is effected by recrystallization.

Paper-chromatographical control is a suitable means for observing the course of the reaction and also the termination. The methods according to Murray A. Kaplan, A. P. Granatek and F. H. Buckwalter (Antibiotics and Chemotherapy, vol. VII (1957), 569) and according to L. Reio (Solvent F) (Chromatographic Review, vol. 1, Elsevier Publishing Company 1959, page 50) may be used for this purpose. The $R_F$-values obtained by paperchromatography of some nitriles prepared according to the process claimed herein are listed in the following table. For these chromatographic tests the paper of Schleicher and Schüll (2043b) was used.

TABLE

| Nitrile | $R_F$ According to Antibiotics and Chemotherapy, Vol. VII (1957) 569 | $R_F$ According to Chromatograph ic Reviews, Vol. 1, Elsevier Publishing Comp. 1959, page 50 |
| --- | --- | --- |
| Tetracycline-nitrile | 0.92 | 0.73 |
| 4-Epi-tetracycline-nitrile | 0.83 | 0.70 |
| Anhydrotetracycline-nitrile | 0.99 | 0.94 |
| Anhydro-4-epi-tetracycline-nitrile | 0.97 | 0.84 |
| Tetracycline-methyl-betainnitrile | 0.93 | 0.84 |
| Anhydrotetracycline-methyl-betain-nitrile | 0.99 | 0.99 |
| Pyrrolidino-methylanhydro-tetracycline-nitrile | 0.37 | 0.60 |
| 5-Hydroxy-tetracycline-nitrile | 0.91 | 0.79 |
| 5-Hydroxy-4-epi-tetracycline-nitrile | 0.77 | 0.69 |
| Anhydro-5-hydroxy-4-epi-tetracycline-nitrile | 0.97 | 0.66 |
| 7-Chlor-tetracycline-nitrile | 0.97 | 0.78 |
| Anhydro-7-chlor-tetracycline-nitrile | 0.99 | 0.92 |
| Desdimethylaminotetracycline-nitrile | 0.99 | 0.99 |

The following examples illustrate the invention but they are not intended to limit it thereto:

*Example 1*

TETRACYCLINE-NITRILE 48.0 grams (0.1 mole) of tetracycline hydrochloride are dissolved at a temperature of 20° C. in 480 ml. of methanol; to this solution are added, while stirring, 41.2 grams (0.2 mole) of dicyclohexyl-carbodiimide. After some minutes, the tetracycline-nitrile starts crystallizing in the form of light yellow rods. The crystallization is terminated after about 6 hours. The precipitate is separated and recrystallized from a mixture of dimethylformamide and methanol. By concentrating in the vacuum the mother liquor of the reaction mixture there is obtained a further quantity of tetracycline-nitrile.

The yield is 34 grams (=80% of the theoretical quantity).

The tetracycline-nitrile is paper-chromatographically pure. It is found to be only sparingly soluble in aqueous 0.1 N hydrochloric acid. In a aqueous 0.1 N-ammonia solution, however, it is readily and clearly soluble. This solution test shows any possible impurities of dicyclohexyl urea. The crystals decompose at temperatures above 262° C. Whereas the tetracycline exhibits three $p_k$ values, the tetracycline-nitrile shows only two $p_k$ values at 7.12 and 9.55. It exhibits the typical nitrile band at 4.5 $\mu$ in its infra-red absorption spectrum.

*Analysis.*—$C_{22}H_{22}N_2O_7$ (molecular weight=426.42). Calculated: C=61.96%; H=5.20%; N=6.57%. Found: C=62.17%; H=5.09%; N=6.61%.

*Example 2*

ANHYDROTETRACYCLINE-NITRILE

The reaction of anhydrotetracycline hydrochloride with dicyclohexyl-carbodiimide takes place in a manner analogous to Example 1. The yield amounts to 80% of the theoretical yield.

The orange coloured nitrile is characterized by the $R_F$ values of its round-filter-paper-chromatograms. These values are indicated in the above table.

*Analysis.* — $C_{22}H_{20}N_2O_7$ (molecular weight=408.40). Calculated: C=64.70%; H=4.94%; N=6.86%. Found: C=64.93%; H=4.86%; N=6.57%.

*Example 3*

TETRACYCLINE-METHYLBETAINE-NITRILE 3.0 grams (0.005 mole) of tetracycline-methoiodide and 1.8 g. (0.01 mole) of tertiary-butylcyclohexyl-carbodiimide are dissolved at 25° C. and while stirring, in 30 ml. of methanol. After some time light yellow needles of tetracyclinemethyl-betaine-nitrile separate from the reaction mixture. The termination of the reaction is determined by paperchromatographical control. The nitrile so obtained is recrystallized from a mixture of dimethylformamide and methanol.

The yield amounts to 1.7 g. (=77% of the theoretical yield). The nitrile discolors at temperatures above 230° C. and decomposes at 285° C. The solubility conditions correspond to those of the tetracycline-nitrile.

*Analysis.*—$C_{23}H_{24}N_2O_7$ (molecular weight=440.44). Calculated for C=62.72%; H=5.49%; N=6.36%. Found: C=62.58%; H=5.30%; N=6.39%.

*Example 4*

ANHYDROTETRACYCLINE-METHYLBETAINE-NITRILE

The reaction of anhydrotetracycline-methochloride with tertiary-butylcyclohexyl-carbodiimide is effected in a manner analogous to that of Example 3. The yield amounts to 73% of the theoretical yield.

The orange colored nitrile is characterized by the $R_F$-values of its round-filter-paperchromatograms, which are given in the table. Anhydrotetracycline-methylbetaine-nitrile decomposes at above 230°.

*Analysis.*—$C_{23}H_{22}N_2O_6$ (molecular weight=422.43). Calculated: C=65.40%; H=5.25%; N=6.64%. Found: C=65.18%; H=5.11%; N=6.40%.

*Example 5*

4-EPITETRACYCLINE-NITRILE 2.2 g. (0.005 mole) of crystalline 4-epitetracycline are introduced, while stirring, into 22 ml. of ethanol containing 0.005 mole of hydrochloride acid. 2.1 g. (0.01 mole) of dicyclohexyl carbodiimide are then added. The reaction mixture is allowed to stand 15 hours at 20° C. under an atmosphere of nitrogen. During this time the dicyclohexyl urea formed crystallizes; it is separated, and the filtrate is concentrated under reduced pressure. Upon addition of ether, the 4-epitetracycline-nitrile separates. The nitrile is recovered from dioxane in pure form. The yield amounts to 1.5 g. (=72% of the theoretical yield). 4-epitetracycline nitrile decomposes at above 202° C.

*Analysis.*—$C_{22}H_{22}N_2O_7$ (molecular weight=426.42). Calculated: C=61.96%; H=5.20%; N=6.57%. Found: C=62.21%; H=5.23%; N=6.33%.

Example 6

ANHYDRO-4-EPITETRACYCLINE-NITRILE

The reaction of the anhydro-4-epitetracycline with dicyclohexyl-carbodiimide is effected in a manner analogous to that of Example 5. The yield amounts to 83% of the theoretical yield. The $R_F$-values of the anhydro-4-epitetracycline nitrile are given in the above table. At temperatures above 200° C., the substance turns slowly dark and is found to be only difficultly soluble in 0.1 N-hydrochloric acid and very readily soluble in aqueous 0.1 ammonia solution.

*Analysis.*—$C_{22}H_{21}N_2O_7$ (molecular weight=408.40). Calculated: C=64.70%; H=4.94%; N=6.86%. Found: C=64.50%; H=4.71%; N=7.00%.

Example 7

PYRROLIDINO-METHYL-ANHYDROTETRACYCLINE-NITRILE

The reaction of pyrrolidinomethyl-anhydrotetracycline with dicyclohexyl-carbodiimide is likewise effected in a manner analogous to that of Example 5; the yield of product is 75% of the theoretical yield. The nitrile so obtained corresponds with regard to its properties ($R_F$-values, infrared absorption spectrum) to the substance obtained by the reaction of anhydrotetracycline-nitrile with formaldehyde and pyrrolidine according to the process described in German Patent 1,044,806. The nitrile discolours slowly at temperatures above 105° C. It is found to be readily soluble in water and in aqueous 0.1 N-hydrochloric acid.

*Analysis.*—$C_{27}H_{29}N_3O_6$ (molecular weight=591.52). Calculated: C=65.98%; H=5.95%; N=8.55%. Found: C=65.77%; H=5.90%; N=8.42%.

We claim:

1. A process which comprises converting a tetracycline compound of the group consisting of tetracycline, anhydrotetracycline, epitetracycline, anhydroepitetracycline, the hydroxy-, chloro-, and bromo-substituted derivatives thereof, the desmethyl-, deshydroxy-, dehydro- and desdimethylamino derivatives thereof, the aminomethylated derivatives thereof and the acid addition salts thereof to the corresponding nitrile by reacting said tetracycyline compound with a carbodiimide of the formula $$R_1-N=C=N-R_2$$

wherein $R_1$ represents a member of the group consisting of isopropyl, tertiary butyl and cyclohexyl and $R_2$ stands for a member of the group consisting of cyclohexyl and alkyl having one to four carbon atoms at a temperature in the range of from 0° to 100° C.

2. A process as claimed in claim 1, wherein dicyclohexyl-carbodiimide is used as carbodiimide.

3. A process as claimed in claim 1, wherein the reaction is carried out in a solvent selected from the group consisting of methanol, ethanol, propanol, isopropanol, dimethylformamide and dimethylsulfoxide.

4. A process as defined in claim 1 wherein the tetracycline compound is tetracycline.

5. A process as defined in claim 1 wherein the tetracycline compound is anhydrotetracycline.

6. A process as defined in claim 1 wherein the tetracycline compound is an epitetracycline.

7. A process as defined in claim 1 wherein the tetracycline compound is an anhydroepitetracycline.

8. A process as defined in claim 1 wherein the tetracycline compound is pyrrolidinomethyl-anhydrotetracycline.

References Cited in the file of this patent

UNITED STATES PATENTS

| | | |
|---|---|---|
| 2,686,180 | Schmidt et al. | Aug. 10, 1954 |
| 2,895,993 | Stephens | July 21, 1959 |
| 2,938,892 | Sheehan et al. | May 31, 1960 |

FOREIGN PATENTS

| | | |
|---|---|---|
| 808,701 | Great Britain | Feb. 11, 1959 |
| 554,099 | Canada | Mar. 11, 1958 |
| 1,025,868 | Germany | Mar. 13, 1958 |

OTHER REFERENCES

Khorana: Canadian Journal of Chemistry, vol. 31, pages 585–8 (1953).